(12) United States Patent
Schrecker et al.

(10) Patent No.: US 8,695,027 B2
(45) Date of Patent: Apr. 8, 2014

(54) SYSTEM AND METHOD FOR APPLICATION SECURITY ASSESSMENT

(75) Inventors: Sven Schrecker, San Marcos, CA (US); Michael Andrews, Redmond, WA (US)

(73) Assignee: McAfee, Inc., Santa Clara, CA (US)

( * ) Notice: Subject to any disclaimer, the term of this patent is extended or adjusted under 35 U.S.C. 154(b) by 142 days.

(21) Appl. No.: 13/173,218

(22) Filed: Jun. 30, 2011

(65) Prior Publication Data

US 2013/0247204 A1    Sep. 19, 2013

(51) Int. Cl.
*H04L 29/06* (2006.01)

(52) U.S. Cl.
USPC .......................................................... 725/25

(58) Field of Classification Search
USPC .................................................... 726/25, 22
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,185,232 B1 | 2/2007 | Leavy et al. | |
| 7,506,155 B1 | 3/2009 | Stewart et al. | |
| 7,620,851 B1 | 11/2009 | Leavy et al. | |
| 2003/0159063 A1* | 8/2003 | Apfelbaum et al. | 713/200 |
| 2005/0273861 A1* | 12/2005 | Chess et al. | 726/25 |
| 2007/0061877 A1* | 3/2007 | Sima et al. | 726/12 |
| 2008/0120722 A1* | 5/2008 | Sima et al. | 726/25 |
| 2010/0293616 A1* | 11/2010 | Young | 726/25 |

* cited by examiner

*Primary Examiner* — Edward Zee
(74) *Attorney, Agent, or Firm* — Patent Capital Group

(57) ABSTRACT

A system and method in one embodiment includes modules for running a test script to generate a request to a target application, receiving a response from the target application, and running a detector script to inspect the response for a vulnerability. More specific embodiments include a target web site, populating a work in a queue, where the work corresponds to content in the response, and running a second test script or detector script to generate a follow-up request to the application if the vulnerability has been identified in the response. Other embodiments include extracting the work from the queue, and running a second test script corresponding to the extracted work. Other embodiments include storing an injection in an injection cache, de-registering the injection from the injection cache if it is identified in the response, and re-crawling the application, if the injection has not been de-registered from the injection cache.

20 Claims, 5 Drawing Sheets

SYSTEM AND METHOD FOR APPLICATION SECURITY ASSESSMENT

TECHNICAL FIELD OF THE INVENTION

This invention relates in general to the field of computer networks and, more particularly, to a system and a method for application security assessment.

BACKGROUND OF THE INVENTION

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files (e.g., web application files) on hosts, servers, and other network computers. As the number of executable software files in a network environment increases, the ability to control, maintain, and remediate these files efficiently can become more difficult. Generally, greater diversity of software implemented in various computers of a network translates into greater difficulty in managing such software. A type of software product is a web application, which enables using a generic user interface (UI) component (e.g., a web browser) to interact with it. Furthermore, web applications are typically accessible by consumers or other users via the Internet and often provide an Internet business segment to an enterprise. However, like all software applications, websites may have vulnerabilities in web applications that hackers may use to compromise secure information stored on web servers and related networked devices. Thus, innovative tools are needed to assist IT administrators in the effective control and management of executable software files on computers within computer network environments.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one embodiment includes running a test script to generate a request to a target application, receiving a response from the target application, and running a detector script to inspect the response for a vulnerability. More specific embodiments include a target web site, populating a work in a queue, where the work corresponds to content in the response, and running a second test script or detector script to generate a follow-up request to the application if the vulnerability has been identified in the response. Other embodiments include extracting the work from the queue, and running a second test script corresponding to the extracted work. Yet other embodiments include storing an injection in an injection cache, de-registering the injection from the injection cache if it is identified in the response, and re-crawling the application, if the injection has not been de-registered from the injection cache.

Example Embodiments

Figure 1:
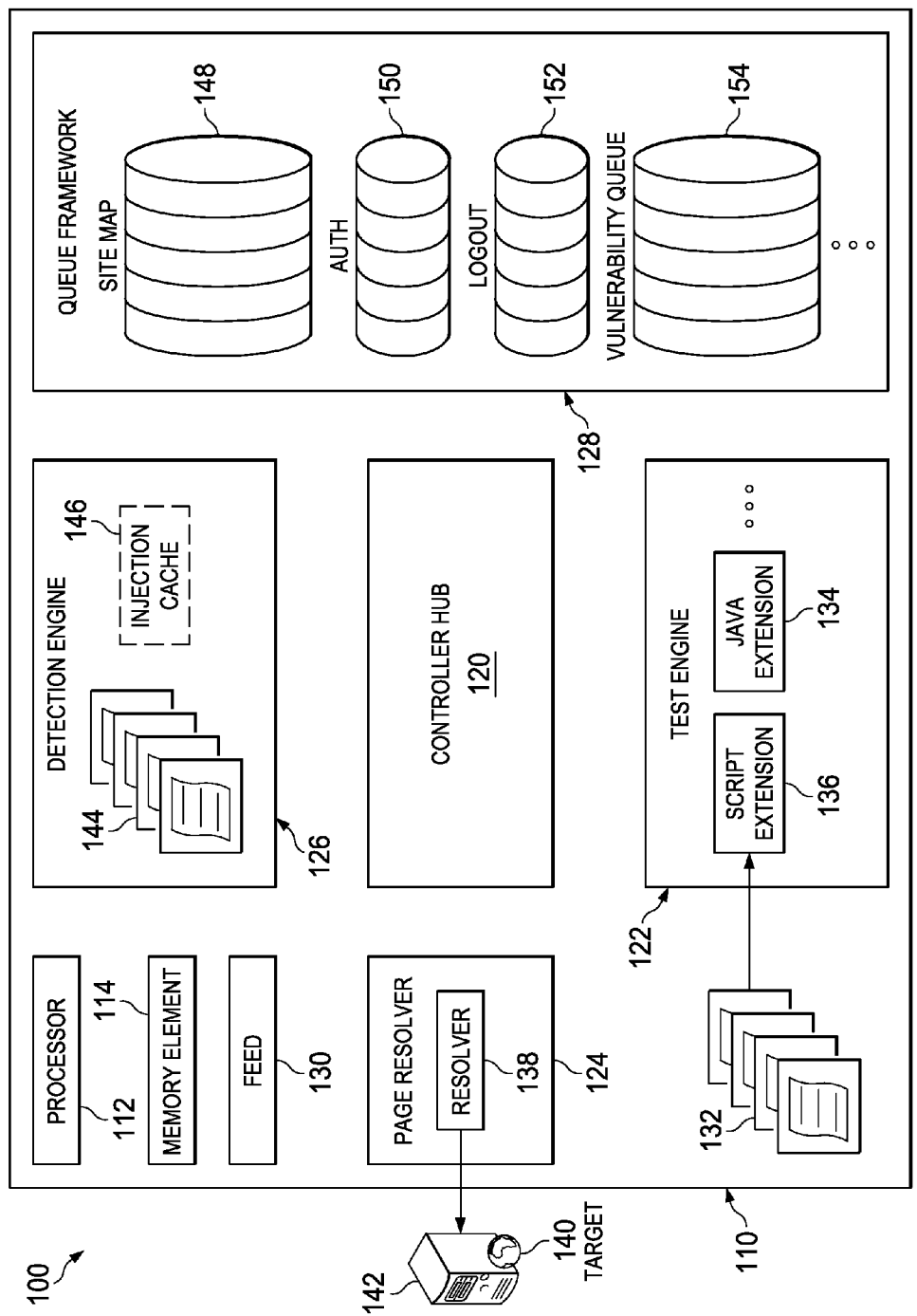
FIG. 1 is a simplified block diagram illustrating components of an application security assessment system according to an example embodiment.

FIG. 1 is a simplified block diagram illustrating an example implementation of an application security assessment system 100 for application security assessment in a network environment. The exemplary network environment illustrates a application security assessment engine 110 comprising a processor 112 and a memory element 114. A controller hub 120 may be suitably connected to a test engine 122, a page resolver 124, a detection engine 126, a queue framework module 128, and a feed module 130. Test engine 122 may read one or more test scripts 132 that may use one or more extension modules, including a java extension module 134 and a script extension module 136. Page resolver 124 includes a resolver module 138 that accesses a target web site 140 hosted on a web host 142. Detection engine 126 comprises one or more detector scripts 144 and at least one injection cache 146. Queue framework module 128 includes one or more work queues, for example, site map queue 148, authorization queue 150, logout queue 152, vulnerability queue 154 and other appropriate queues based on particular implementations and needs (e.g., EVIDENCE queue, PAGE queue, LINK queue, WORK ENTRY queue, SCRIPT queue, ERROR queue, etc.). As used herein, the terms "cache" and "queue" are memory elements and encompass any suitable a data structure designed to hold work. The term "work" as used herein includes information related to web assessment activities (e.g., vulnerabilities, links, page locations, injections, responses, parameters, etc.) and tasks, which may include code or sets of program instructions loaded into memory.

Embodiments of application security assessment engine 110 may test and thoroughly analyze one or more pages on web site 140. Components of application security assessment engine 110 may attempt to detect and exploit vulnerabilities in web site 140. For example, a collection of test scripts 132 in test engine 122 may generate requests that page resolver 124 may send to a target system (e.g., web site 140). Web site 140 may generate a response in return. A collection of detector scripts 144 in detection engine 126 may access each response from the target system to check for vulnerabilities, login pages (and/or forms), and other interesting web components in the response. Application security assessment engine 110 may allow detector scripts 144 to submit new tasks (e.g., tasks to test login pages, login forms, etc.) into a bank of work queues in queue framework module 128. Test scripts 132 can consume the work queues, allowing each test script 132 to react dynamically to the target's response after detector scripts 144 have completed their submission. Components of application security assessment engine 110 may also crawl web site 140 (e.g., browse web site 140 in an orderly manner) and store an inventory of substantially all its content (e.g., pages, authorizations and forms) in queue framework module 128 for later testing by test engine 122. Test scripts 132, queue framework module 128, and detector scripts 144 may be updated by feed module 130 via controller hub 120. Controller hub 120 may generate reports comprising vulnerabilities with corresponding requests and responses.

The network environment illustrated in FIG. 1 may be generally configured or arranged to represent any communication architecture capable of electronically exchanging packets. In addition, the network may also be configured to exchange packets with other networks such as, for example, the Internet, or other LANs. Other common network elements (e.g., email gateways, web gateways, routers, switches, load-balancers, firewalls, etc.), may also be provisioned in the network.

For purposes of illustrating the techniques of application security assessment system 100, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments, both in organizations (e.g., businesses, schools, government organizations, etc.) and in homes include a plurality of computers such as end user desktops, laptops, servers, network appliances, mobile devices, embedded devices (e.g., printers), and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that only trusted and approved executable software files are present. Although computers in a network may initially be configured with only trusted and approved executable software, continuous efforts (both electronic and manual) are usually necessary to protect against unknown and/or malicious software. In particular, applications may have vulnerabilities susceptible to security breaches. As used herein, the term "application" encompasses computer software configured to perform one or more tasks. Examples include enterprise software (such as databases, emails, etc.), accounting software, office suites, graphics software, web sites, and word processing software.

In particular, web sites may have vulnerabilities in web applications (e.g., applications that may be presented through a web site) that hackers may use to compromise secure information stored on web servers and related networked devices. Web application security assessment has long been a vital component of vulnerability management. Web applications are frequently the targets of choice by hackers due to the depth and breadth of vulnerabilities found on web applications. Historically, hackers have preyed upon web applications due to the ready availability of vulnerabilities, the privileged access to other resources (e.g., databases) and the ability to leverage the web server as a platform for further attacks into the network or out into the Internet cloud. Due to a proprietary nature of web application development, few mitigation methods are available. One available mitigation method against web vulnerabilities has been to identify and fix code errors, mis-configurations, and other such issues, when possible.

Web application vulnerabilities may provide a pathway for unauthorized access to critical and proprietary information, inappropriate use of resources, business interruptions, fraud, and security breaches. Nearly all web applications may be proprietary development efforts, yet vulnerabilities can abound in well defined, and easily exploitable, categories. For example, a web form on an Internet seller's web site may present a vulnerability by permitting a javascript upload in a product description form that is rendered by a user's browser, resulting in security breaches. The javascript may cause a product to be added to the shopping cart when the user brings up the product description on his/her browser. As another example, the javascript may cause the user's browser to add the product to the user's shopping cart whenever the user visits the seller's web site. Thus, the form could present a vulnerability by allowing unwanted content to be added to the user's online shopping cart. Therefore, the input and the output of the web form in the example should be sanitized on the website to prevent injection of unexpected behavior into the seller's web site.

In general, web scans may be used to test for vulnerabilities. In order to identify vulnerabilities, requests are typically sent to a target website to generate responses that expose a vulnerability. Typical web assessment engines may run approximately a hundred (or more) test scripts on each page in a web site. The scripts may attempt to inject data into fields, login, etc. to detect the presence of vulnerabilities. Each test script sends out a request and then looks at the result, which may be categorized as either vulnerable or not. Typically, such web assessment engines do not analyze web sites for content, for example, if the web site contains javascript or forms, but instead run substantially all test scripts indiscriminately on every page in the web site. Therefore, the process may take a long time, especially if a web site has numerous pages. Moreover, the process is susceptible to false positives, when unnecessary tests are run on web pages (e.g., javascript tests run on pages that do not contain javascripts), or when tests are performed at inappropriate times (e.g., tests requiring a user to be logged in being run when the user is not logged in or is no longer logged in due to intentional or unintentional logout).

Web pages are typically designed in an ad hoc manner; they may lack standardization and organized frameworks. For example, different web sites may have different kinds of forms such as login and logout forms. A login form on one web site may be different from a login form on another web site. When typical web assessment engines run assessments indiscriminately on such forms, unexpected results may occur. For example, if tests are run on a logout page, a web assessment engine may be inadvertently locked out of the session by the web site 140. All previous testing results may also be lost if they have not been saved previously. Even if previous testing results have been saved, however, the session may be lost upon logout, so any additional tests may have to be run in a new session, losing all the state from the previous session and resulting in unpredictable results.

Another example of a vulnerability may be a form that can accommodate a variety of text, including Structured Query Language (SQL) commands. If the web form is not configured appropriately to prevent unauthorized SQL commands, a hacker may gain entry into databases connected to the web site through a suitable SQL command in the appropriate form. For example, an injection may be inserted into a form in SQL command format. Instead of adding a text to a specific field in a database, the SQL command may cause the database to return a list of all usernames and passwords stored on the web host. In another example, an injection may be inserted into a page parameter. The injection may perform a directory traversal to pull back a configuration file of the web server. Determining such vulnerabilities may be manually time consuming and prone to many human errors. However, automating the process of determining vulnerabilities is challenging at least in part because of the lack of standardization of web pages.

Moreover, new, insidious vulnerabilities have emerged (and continue to emerge) to add additional risks to web applications. Typical web assessment engines are not scalable, and consequently may have to be updated and/or revised in their entirety, including by modifying its source code, to accommodate tests for newly found vulnerabilities. Therefore, a formalized framework is needed to consistently probe for the existence of the vulnerabilities in an efficient, targeted, intelligent, and scalable manner.

A system for application security assessment outlined by FIG. 1 can resolve many of these issues. Embodiments of the present disclosure seek to vastly improve capabilities of existing technologies to allow for a more robust solution. Application security assessment engine 110 included in system 100, according to certain exemplary embodiments, is architected as a scalable solution in which some or all business logic is dynamically loaded by test scripts 132. Application security assessment engine 110 is configurable to allow differing levels of assessment (e.g., limiting assessments to a specific amount of time, sending a certain volume of traffic, scanning to a certain depth based on a specified starting point, etc.). In addition, the generic framework allows detection logic to be embedded into the script content. Thus, new capabilities may be added without necessarily updating the engine 110 itself. Finally, system 100 is configurable to allow multiple different products to leverage technology in various ways, for example, all off a same core product. For example, system 100 may be used to identify vulnerabilities in database applications, and general computer applications that may be unrelated to web applications.

In accordance with one example implementation of application security assessment system 100, a method is provided for creating an assessment life-cycle that allows each page of a web application to be tested completely before moving on to the next page. As used herein, the term "page" encompasses a logical representation of a page on a web site and it can be uniquely identified by a URL. A page may be conceptualized as a leaf node in a directory tree describing the web site. Each page has a finite depth below the root, and is a member of exactly one "directory". It has a "path" represented by the URL referencing the page. A page may not have any parameters. As used herein, the term "URL" encompasses a page plus associated parameters, port, and protocol. Multiple URLs can point to the same page. Alternatively, a page may reference multiple URLs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, the example network environment may be configured as one or more networks in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link connecting components of application security assessment engine 110 may represent any electronic link supporting a LAN environment such as, for example, cable, Ethernet, wireless technologies (e.g., IEEE 802.11x), ATM, fiber optics, etc. or any suitable combination thereof.

In other embodiments, communication links in application security assessment engine 110 may represent a remote connection to web host 142 through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area network (e.g., the Internet). In addition, gateways, routers, switches, and any other suitable network elements may be used to facilitate electronic communication between web host 142 and application security assessment engine 110. Note that the network illustrated in FIG. 1 may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs.

In an example embodiment, web host 142 may represent web servers or other network elements that may be configured to present web sites to consumers and businesses. For example, web host 142 may be a single server, or a bank of servers. Web host 142 may be located at a single location, or may be dispersed over an enterprise cloud. Web host 142 may also represent end user computers that could be operated by end users. The end user computers may include desktops, laptops, and mobile or handheld devices (e.g., handheld computing devices such as iPads®, personal digital assistants (PDAs), smartphones, mobile phones etc.), or any other type of computing device operable by an end user. Web host 142 may additionally represent embedded devices such as, for example printers, GPS receivers, videogame consoles, home appliances, traffic lights, factory or plant controllers, and any other devices or systems designed to perform one or a few dedicated functions. It should be noted that the network configurations and interconnections shown and described herein are for illustrative purposes only. FIG. 1 is intended as an example and should not be construed to imply architectural limitations in the present disclosure.

According to embodiments of the present disclosure, test engine 122 may feed off one or more contents of queue framework module 128 and may send one or more requests to page resolver 124 targeted at web site 140 to quantify any vulnerabilities in applications associated with web site 140. Test engine 122 may leverage extensions (e.g., content for web engines) to perform specific testing tasks. Extension modules may be configured with an object oriented programming language (e.g., Java), a scripting language (e.g., JavaScript), or any other suitable programming language. In an example embodiment, test engine 122 leverages java extensions using java extension module 134 and script extensions (e.g., JavaScript, Groovy) using script extension module 136 to initiate actions in target web site 140. Test engine 122 may consume queues in queue framework module 128 as it performs its tasks.

In an example embodiment, logic about vulnerabilities and how to assess web site 140 may be stored within test scripts 132. In one embodiment, test engine 122 may test a page in web site 140 to completion prior to moving on to a next page in web site 140. For example, a page in web site 140 may be assessed until all relevant test scripts 132 have been run and all queues have been appropriately exhausted. In an example embodiment, each test script 132 may run on each page of web site 140. In another example embodiment, multiple test scripts 132 may run in parallel. In yet another example embodiment, test scripts 132 applicable to web content on the page may be run on each page. For example, if a web page A contains javascript and another web page B in the same web site contains a form, javascript test script (but not form test script) could be run on web page A, and form test script (but not javascript test script) could be run on web page B. In an example embodiment, test script 132 may test a page on web site 140, identify vulnerabilities on the page and store the identified vulnerabilities in vulnerability queue 154.

In one embodiment according to the present disclosure, test engine 122 may be capable of crawling web site 140 including extracting links for later crawling and testing (e.g., link-type targets), and gathering forms for later injection (e.g., injectable-type targets) in addition to performing other functions (e.g., tracking login state, detecting logout events, and being able to re-login to attempt to continue testing the application). Test scripts 132 may include in-line tests that run in sequence against every page on web site 140. Test scripts 132 may include tests that run alongside or in the background or in the end, for example, brute force password guessing tests, password cracking, etc. Test engine 122 may also perform vulnerability testing through injection, cross-site request forgery (CSRF) detection, cross-site scripting (XSS), etc. Test engine 122 may perform testing via logical test partitioning, for example, tests partitioned into categories or tests based on thoroughness. In one example embodiment, test categories may be defined and stored in databases coupled to test engine 122. Test thoroughness parameters may be defined in test scripts 132. Some test scripts may be run for particular scenarios, for example, scenarios wherein tests may not damage web site 140. Test engine 122 may send requests, receive responses (e.g., injections) routed via detection engine 126, allow for follow-up requests based on responses and report any vulnerabilities detected on web site 140.

Page resolver 124 may comprise network interfaces for communicating with web site 140. Page resolver 124 may send one or more requests from test scripts 132 to web site 140 and collect the corresponding responses from web site 140. In one example embodiment, page resolver 124 may implement socket-level operations. Page resolver 124 may also handle message uniqueness and authentication, including form-based authentication, basic authentication, digest authentication, network local area network manager (NTLM) authentication, and certificate based authentication. Page resolver 124 may perform scan control, including aborting, pausing, and resuming scan of web site 140. Additionally, page resolver 124 may set cookies, and take other actions to elicit a response from web site 140.

Detection engine 126 may observe and inspect responses from web site 140, and identify vulnerabilities and any new work to be performed in current or future scans. Detection engine 126 may perform various functions, including in conjunction with test engine 122, to leverage extensions to perform specific detection tasks, to intercept and monitor traffic to and from web site 140, and to identify certain categories of vulnerabilities. Detection engine 126 may store injections registered by test scripts 132 in injection cache 146. In an example embodiment, detection engine 126 may identify vulnerabilities in web site 140 and store the identified vulnerabilities in vulnerability queue 154.

Responses from web site 140 can pass through detector scripts 144. Each detector script 144 may inspect each response, looking for different parameters such as vulnerabilities, content type, authentication, etc. In an example embodiment, all detector scripts 144 may inspect each response. If any detector script 144 finds a parameter of interest, for example, a vulnerability, the request and response may be populated (e.g., saved) into appropriate queues in queue framework module 128. Detector script 144 may also determine that new types of tests and further investigation are warranted based on the parameter. So, detector script 144 may save the parameter and/or response into queue framework module 128. In one illustrative example, a test script 132 encompassing a crawling mechanism may initiate a test to be run on web site 140. In the corresponding response, a web form having certain parameters and certain fields may be encountered on web site 140. Detector scripts 144 may be configured to determine whether the web form is a login form. If it is a login form, authentication queue 150 may be populated by detection engine 126 for additional testing by test engine 122. In another example, a link detector in detector script 144 may find a link in a response from a page on web site 140 and drop the link into site map queue 148 for later testing by test script 132. Thus, detection engine 126 may populate work queues in queue framework module 128 when additional tasks are identified.

In an example embodiment according to the present disclosure, a recording of a login process on web site 140 may be saved by test engine 122. For example, the login process may be an Extensible Markup Language (XML) script. If web site 140 contains a logout form, and inadvertently locks out the testing process, detection engine 126 may detect such lock out in a response from web site 140. Detection engine 126 may communicate the lock-out to test engine 122, which may initiate the login process immediately and attempt to pick up where the testing process left off. For example, test engine 122 may attempt to re-establish the session and retrieve data from the previous testing.

According to embodiments of the present disclosure, test engine 122 and detection engine 126 can work together to successfully test and detect vulnerabilities in web applications. Test scripts 132 can initiate a request to web site 140, for example, attempt to initiate an action on web site 140, and detector scripts 144 can seek that action in the response from web site 140. Embodiments of system 100 may react to the content on web site 140 and accordingly tailor testing to such content. For example, if detector scripts 144 find javascript on web site 140, the javascript may be added to a javascript queue in queue framework module 128. Test engine 122 may detect the javascript queue in queue framework module 128 and accordingly run a suitable test script 132 that tests for vulnerabilities specific to javascripts. In another example embodiment, certain test scripts 132 may test for caching of user names and/or passwords in login forms. In an example embodiment, detector script 144 may identify a login page and populate authentication queue 150 in queue framework module 128. Test script 132 may extract the login page and test whether caching of usernames and/or passwords is turned on for the login page. Detector scripts 144 may examine the response from web site 140 and flag a vulnerability if caching is found.

In yet another example embodiment, an initial crawl of web site 140 may indicate that login forms may be present on certain pages of web site 140. Web content that may be presented to authenticated users on such web site 140 may be different from web content that may be presented to an unauthenticated user. There may be differences in web content presented to different classes of authenticated users also. For example, on an Internet shopping web site, a shopper may see certain pages related to products for sale. On the other hand, a seller may see completely different pages on the same web site, related to populating product catalogs, for instance. An IT administrator may see yet another web content on the same web site, related to administrative and maintenance tasks to be performed on the web site. Test engine 122 and detection engine 126 may detect such classes of content and perform multiple sweeps of web site 140 to test for vulnerabilities in all classes, for example, to ensure that the appropriate content is presented to the corresponding user.

In one example embodiment, detection engine 126 may prompt test engine 122 to send follow-up "surgical requests" in reaction to certain vulnerability findings in traffic. For example, test engine 122 may send surgical requests targeted at specific problematic pages on web site 140. In an example embodiment, in response to a vulnerability detection, a "surgical request" can be sent by test script 132 to determine some characteristic of the vulnerability (e.g., for reporting purposes or to differentiate between two similar vulnerabilities). Responses to such surgical requests may not pass through the detection engine 126 and such surgical requests may be used to further quantify vulnerabilities in specific instances. When relevant detector scripts 144 have reviewed responses from web site 140, control may go back to test engine 122. Test scripts 132 may determine, for example, based on content in queue framework module 128, whether additional tests, such as surgical requests, may be run on web site 140. Alternatively, detection engine 126 may perform the surgical request. According to an example embodiment, detector script 144 may include code for sending follow-up surgical requests to target web site 140.

Queue framework module 128 may store work in multiple queues for test engine 122 to consume, and such queues can be populated by detection engine 126. Thus, queue framework module 128 may also facilitate communication between test engine 122 and detection engine 126. An arbitrary number of queues may be present at any given time in queue framework module 128. Queues may be programmatically created. For example, a new queue may be created when both test engine 122 and detection engine 126 agree about the new queue's content. In an example embodiment, queues may be created based on configuration of detection engine 126.

According to exemplary embodiments, queues may contain arbitrary data structures based on need. The queues may contain links (e.g., URL link type WorkQueueEntry) and forms (e.g., HTTP form type WorkQueueEntry) to be tested and insures duplicate requests are not sent. In an example embodiment, queue framework module 128 may store site map queue 148, authorization queue 150, logout queue 152 and vulnerability queue 154. In other example embodiments, queue framework module 128 may store additional queues, for example, EVIDENCE queue, PAGE queue, LINK queue, WORK ENTRY queue, SCRIPT queue, ERROR queue, etc. Sitemap queue 148 may contain a "connectedness" relationship between all pages on web site 140. Authorization queue 150 may contain pages that are known to be login related (e.g., pages that ask for login credentials, etc.) and logout queue 152 may contain page(s) which may enable a logout from web site 140.

Content of queues, test scripts 132 and detector scripts 144 may grow and/or change over time by addition of new and/or changed content via feed module 130. In an example embodiment, assume that queue framework module 128 is not provisioned with a javascript queue. Application security assessment engine 110 may not be able to detect and test for javascripts in target web sites in this scenario. To enhance functionalities of application security assessment engine 110 with javascript testing functionality, a javascript queue may be added to queue framework module 128, and corresponding javascript test script and javascript detector script may be added to test engine 122 and detection engine 126, respectively, via feed module 130. Thus, a whole new functionality, viz., javascript testing functionality, may be added to application security assessment engine 110 without changing its core architecture, or software code. In example embodiments, feed module 130 may update content via feeds. In alternate embodiments, feed module 130 may be configured to retrieve updates from a remote server. Other known methods of updating content of queues, test scripts 132 and detector scripts 144 may be possible without departing from the scope of the present disclosure.

According to embodiments of the present disclosure, controller hub 120 may enable components of system 100 to communicate with each other. Controller hub 120 may coordinate workflows, for example, check content in queue framework module 128 to determine tests to be run, and correlate the content with requests sent to page resolver 124 targeted at web site 140. Application security assessment engine 110 may use processor 112 and memory element 114 to facilitate communication, computation and other functionalities of various components. Controller hub 120 may be configured to generate reports from various queues in queue framework module 128.

Not shown in application security assessment system 100 of FIG. 1 is hardware that may be suitably coupled to application security assessment engine 110 in the form of consoles, user interfaces, memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access by page resolver 124 and/or other components of system 100. Any suitable operating systems may also be configured in components of system 100 to appropriately manage the operation of hardware components therein. Components of system 100 may include any other suitable hardware, software, components, modules, interfaces, or objects that facilitate the operations thereof. This may be inclusive of appropriate algorithms and communication protocols that facilitate the application security assessment operations detailed herein. Similarly, web host 142 may also be configured with any appropriate processors, memory, and other hardware, software, components, modules, interfaces or objects that facilitate the operations thereof.

These elements, shown and/or described with reference to system 100 are intended for illustrative purposes and are not meant to imply architectural limitations. In addition, each device, including application security assessment engine 110 and web host 142, may include more or less components where appropriate and based on particular requirements. As used herein in this Specification, the term 'computer' is meant to encompass any personal computers, laptops, network appliances, routers, switches, gateways, processors, servers, load balancers, firewalls, or any other suitable device, component, element, or object operable to affect or process electronic information in a network environment.

Application security assessment system 100 may be adapted to provide application security assessment activities for electronic data (e.g., web pages of a web application), which could be resident in memory of a computer or other electronic storage device. Information related to application security assessment activities can be suitably rendered, or sent to a specific location (e.g., test engine 122, queue framework module 128, etc.), or simply stored or archived, and/or properly displayed in any appropriate format.

Figure 2:
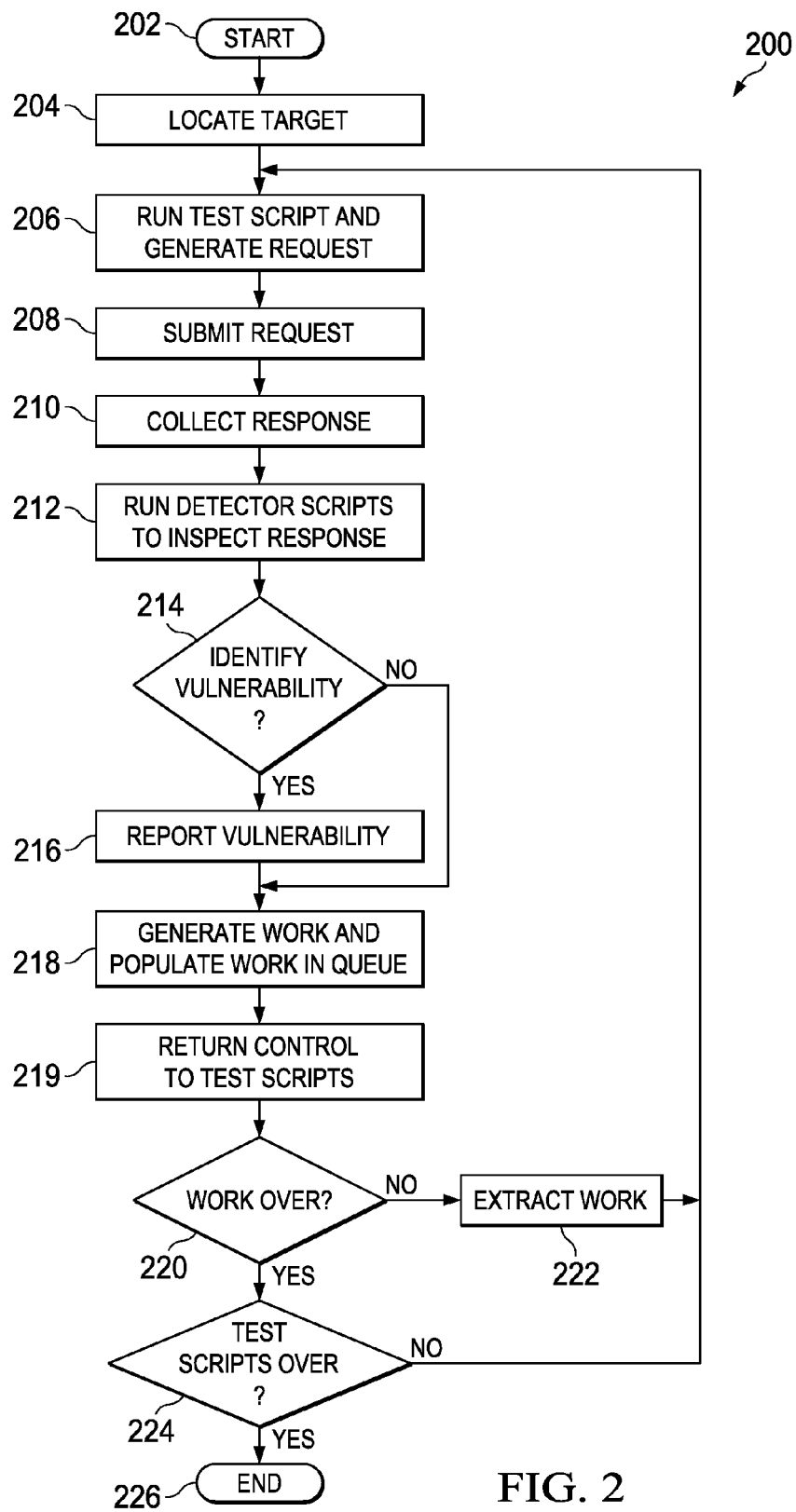
FIG. 2 illustrates a simplified flow-chart showing example operational processing that may be associated with an embodiment of the present disclosure.

Turning to FIG. 2, FIG. 2 illustrates a simplified flow-chart showing example operational processing 200 associated with an embodiment of application security assessment system 100. A test process begins at step 202 when application security assessment engine 110 is started up, for example, by a user or automated process initiation script. Controller hub 120 may be presented with a URL of target web site 140, and other test parameters, for example, scan termination parameters, scan depth, test exclusions, delay between tests, start URL, excluded URL, excluded parameters, etc. In step 204, controller hub 120 may locate target web site 140. In step 206, test engine 122 runs at least one test script 132 and generates a request to web site 140. For example, the request may ask web site 140 to return a page in web site 140. In step 208, page resolver 124 submits the request to web site 140 and collects a corresponding response in step 210. For example, the corresponding response may include the requested page on web site 140. Page resolver 124 sends the response to detection engine 126.

All relevant detector scripts 144 in detection engine 126 may be run to inspect the response in step 212, and identify vulnerabilities, if any, in step 214. In an example embodiment, detector script 144 may determine that additional information regarding an identified vulnerability may be needed, for example, to differentiate between two similar types of vulnerabilities. Detector script 144 may include code to execute a suitable surgical request to target web site 140 to differentiate between the two similar types of vulnerabilities. When vulnerabilities are identified in step 214, the vulnerabilities may be reported in vulnerability queue 154 in step 216. For example, when a vulnerability is identified, the vulnerability, it's metadata, and other information relevant to web site 140 may be saved into vulnerability queue 154, which may be later exported into a report.

Work may be populated in queue framework module 128 in step 218. For example, detector scripts 144 may generate a site map and populate site map queue 148 in queue framework module 128. Detector scripts 144 may detect a login form on one of the pages in the response and populate authentication queue 150. Detector scripts 144 may determine that some Ajax javascript forms are present in some of the pages in the response and populate an Ajax javascript queue.

In step 219, detector scripts 144 may return control to test engine 122, which may follow up with surgical requests, if needed. In an example embodiment, a return of control may be temporary. For example, test script 132 may contain instructions to detector script 144 to return control for determining the nature of the vulnerability. When control is returned to test script 132 as instructed, test script 132 may follow-up with surgical requests, or running other tests on the identified vulnerability/response. Test scripts 132 may then return control back to detector scripts 144 to continue running the remainder of detector scripts 144. After all relevant detector scripts 144 have completed running on the response from web site 140, detector scripts 144 may return control finally to test engine 122.

Test engine 122 may check if work is over by determining whether queues in queue framework module 128 are exhausted in step 220. If work is not over, test engine 122 extracts work from queue framework module 128 in step 222 and the process loops back to step 206. For example, test engine 122 may determine that there is no more work related to generating requests for pages from web site 140. On the other hand, test engine 122 may see new content in site map queue 148 and determine that additional requests for pages are necessary based on work in site map queue 148.

If work in queues is over for the test script being executed, then test engine 122 may determine whether all test scripts have been run in step 224. For example, test engine 122 may detect that authentication queue 150 has content populated by detection engine 126 and requires running test scripts related to authentication. Test engine 122 may also detect content Ajax javascript form queues and determine that Ajax test scripts may be run. If all test scripts have not been run, the process loops back to step 206, and the next test script is run. The process repeats until all test scripts have been run, queues have been emptied, and any other scan termination parameters have been met in step 226. Thus, web site 140 may be tested in an organized, automatic, methodical and efficient manner.

Figure 3:
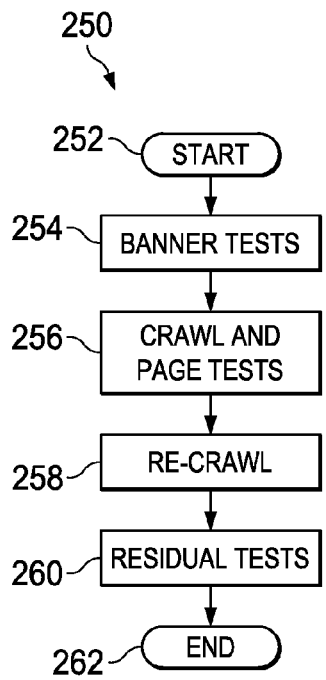
FIG. 3 is a simplified flow-chart illustrating example operational steps that may be associated with an embodiment of the present disclosure.

Turning to FIG. 3, FIG. 3 is a simplified flow-chart illustrating example operational steps in method 250 associated with scan testing according to an embodiment of the present disclosure. Scan testing is initiated in step 252. Specific test scripts 132 to run may be chosen based on a scan configuration. In an example embodiment, each test script 132 and/or test may be uniquely identified in the configuration. Appropriate test scripts 132 may be dynamically loaded at a start of the scan. Test scripts 132 may also unload themselves. To test for vulnerabilities associated with client-side code, test scripts 132 may be executed in a sand-box. A sand-box is a security mechanism for executing untrusted software code from unverified third-parties, suppliers and untrusted or unknown users. The sand-box typically provides a tightly-controlled set of resources for guest programs to run in, such as scratch space on disk and memory. Network access (e.g., inspecting a host system, reading from input devices, etc.) is usually disallowed or heavily restricted. Executing test scripts 132 in the sandbox allows the tests to observe the operation of test scripts 132 and evaluate the outcome. Supportable technologies include, but are not limited to Javascript (Ajax), Flash, Silverlight, etc.

In step 254, test scripts 132 encompassing banner tests may be run. Banner tests may be designed to determine application-level data points such as server type, development language, etc. Banner tests may not be page-centric. For example, a banner test may be run once for web site 140 in its entirety irrespective of a number of pages on web site 140. Once the banner tests have been executed, banner tests can be unloaded.

In step 256, test scripts 132 encompassing generic tests, for example, authenticated and unauthenticated crawl and page tests, may be run against each page in web site 140. Generic tests may include, for example, SQL Injection tests, Cross Site Scripting (XSS) tests, and directory traversal tests. In some embodiments, a majority of the testing time may be spent on such generic tests. Alternatively, crawl and page tests may be run separately in different stages (e.g., crawl tests may be run first, followed by other tests, and finally followed by page tests).

In step 258, test scripts 132 encompassing re-crawl may be run to ensure that every relevant page in web site 140 has been tested for every relevant injection. Re-crawl tests may be similar to or the same as crawl tests. In an example embodiment, test script 132 encompassing a re-crawl test may be the same as the test script encompassing a crawl test. In another example embodiment, re-crawl may be performed for tests that did not result in proper responses, or for other reasons. In step 260, test scripts 132 encompassing residual tests (e.g., tests that require caches to be populated for running the test) may be run. For example, a test that attempts to access pages requiring authentication without authenticating first may run after a cache of authenticated pages has been populated. In an example embodiment, such residual tests can be run at a conclusion of testing a page. In another example embodiment, the residual tests can be run at the conclusion of the entire scan. In example embodiments, one or more tests may be run in parallel. For example, brute force password guessing tests, which typically take a long time to run, may be run in parallel with crawl and page tests.

Scanning is terminated in step 262. The scan may be terminated when one of the following events occurs: (1) there is no more work to do (e.g., queues are exhausted); (2) one of the boundaries has been exceeded; (3) a terminal error occurs; or (4) a user terminates the scan. Boundaries may include specified limits on certain variables, including but not limited to: time limit, number of requests, scan depth, communication failures, authentication failures, and site errors. For example, if a specified time limit is exceeded, or a number of authentication failures exceeds a specified maximum number of allowed authentication failures, scan may terminate.

Figure 4:
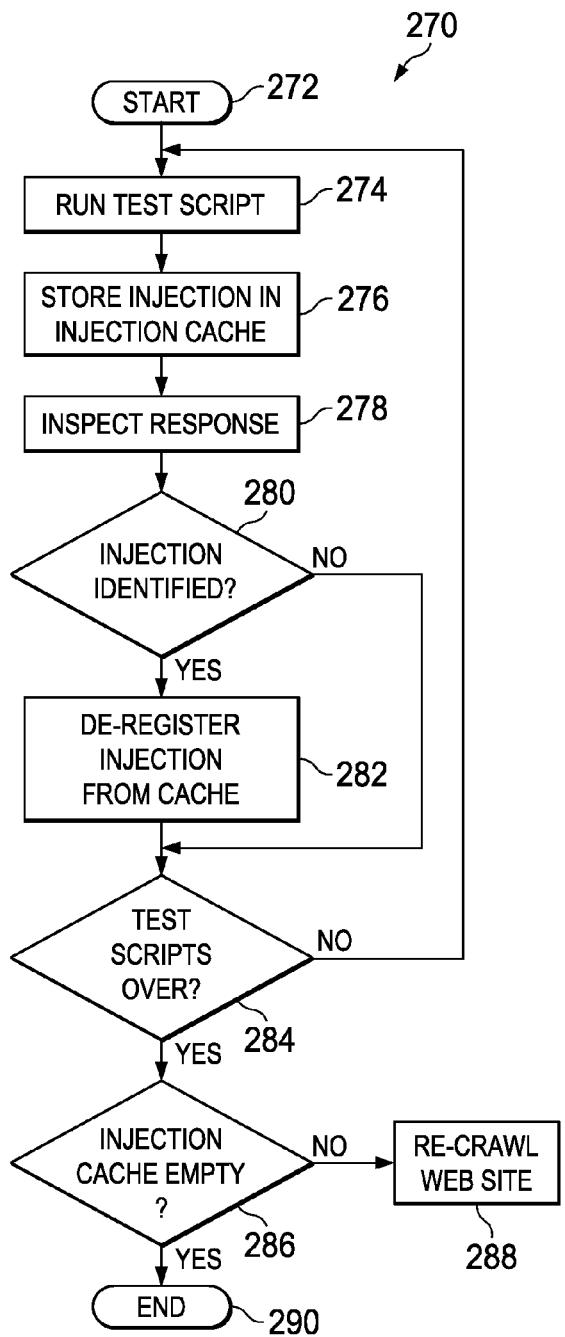
FIG. 4 is a simplified flow-chart illustrating example operational steps that may be associated with embodiments of the present disclosure.

Turning to FIG. 4, FIG. 4 is a simplified flow-chart illustrating example operational steps associated with a method 270 for application security assessment according to embodiments of the present disclosure. The method starts in step 272 when injection type test script 132 is called. Injection type test scripts 132 are run in step 274. Injection type test scripts 132 may inject an injection into a web site 140 and store the injection in injection cache 146 in step 276. For example, an injection test script 132 may inform detection engine 126 (e.g., by storing in injection cache 146) of a unique word being injected into a form comprising user names. In another example, injection test script 132 may register injections (e.g., RegEx patterns) with injection cache 146 at a time of injection. In example embodiments, injection cache 146 may comprise injections from various injection type test scripts 132.

In step 278, injection cache 146 can inspect any responses from web site 140 in search of evidence that an injection succeeded. Injection cache 146 may be aware of the presence of stored injections for the remainder of the scan. In an example embodiment, injection cache 146 may be configured to find injections independent of any particular tests being performed on web site 140, such as on a different page, or on a previously tested page. For example, injection cache 146 may examine each response from web site 140 for presence of the unique word injected into the form comprising user names. If the injection is identified in any of the responses in step 280, injection cache 146 may de-register (e.g., remove or delete) the injection from injection cache 146 in step 284.

If injections have not been identified in step 280, controller hub 120 may check to see if all relevant test scripts 132 have been run in step 284. If all relevant test scripts 132 have not been run, the process loops back to step 274. Otherwise, if all relevant test scripts 132 have been run, controller hub 120 may inspect injection cache 146 to determine if it is empty in step 286. If injection cache 146 is not empty (e.g., injection cache 146 returns a non-zero value indicating that not all injections stored by test scripts 132 have been de-registered), then controller hub 120 may initiate a re-crawl of web site 140 in step 288. In an example embodiment, injections inserted into a web page on web site 140 may show up in a web page that has already been tested. Therefore, to pick up such residual injections (e.g., injections populated in the injection cache that were not identified in subsequent testing), a re-crawl and/or surgical re-test may be performed.

During the re-crawl, if additional work is identified, such work may be populated in queue framework module 128 for additional tests later. For example, injection cache 146 may find that the unique word injected into the form comprising user names may be rendered in an inappropriate location in another page on web site 140 in a manner so as to be susceptible to theft by hackers. Detector scripts 144 may report a source of the injection when a vulnerability is detected, and/or store the vulnerability in vulnerability queue 154. When injection cache 146 is emptied of all stored injections, the process ends in step 290.

Figure 5:
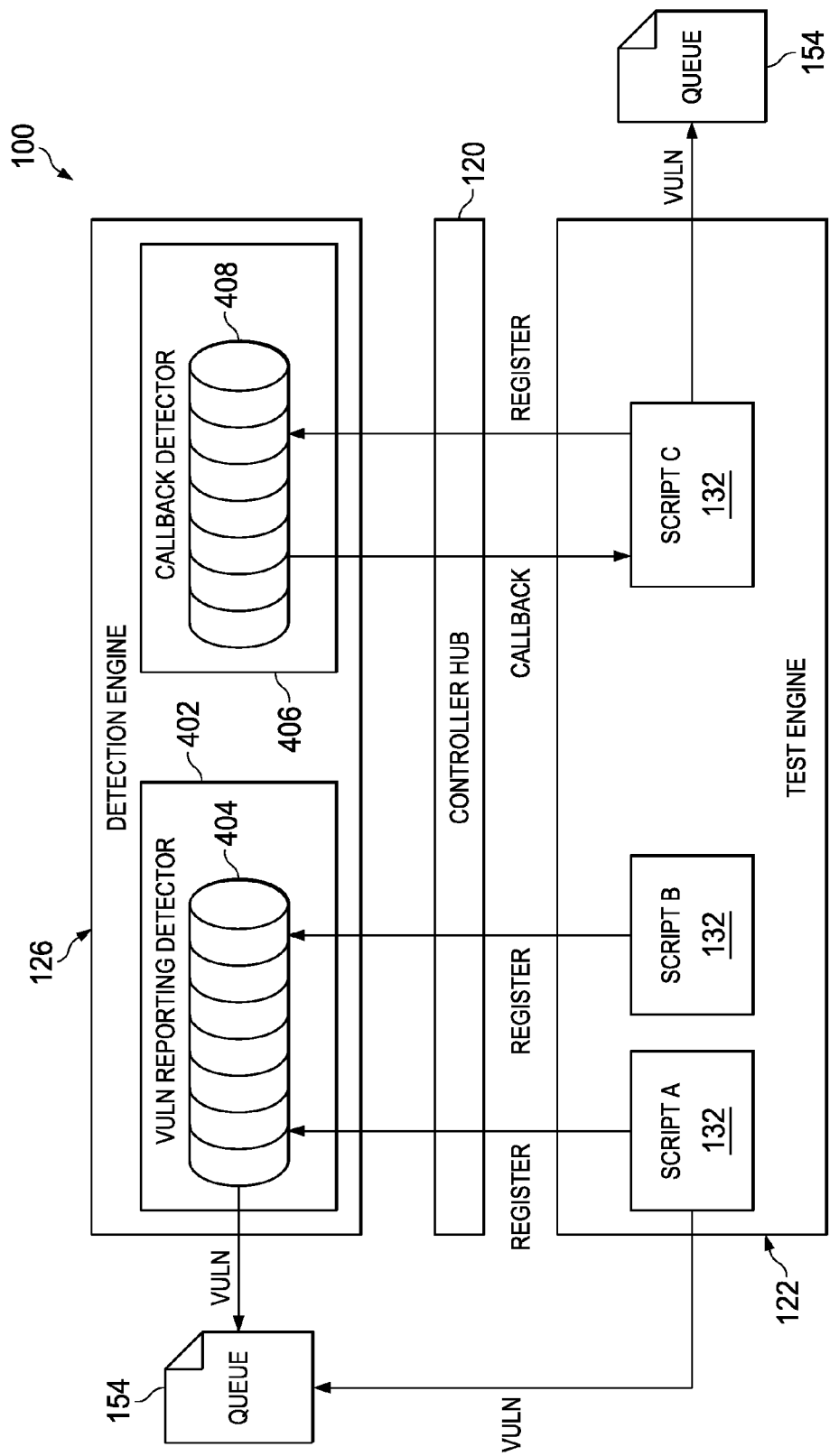
FIG. 5 is a simplified block diagram showing additional details of application security assessment system that may be associated with reporting vulnerabilities according to embodiments of the present disclosure.

Turning to FIG. 5, FIG. 5 is a simplified block diagram showing components of application security assessment system 100 associated with reporting vulnerabilities according to embodiments of the present disclosure. Vulnerabilities can be reported from various locations, for example, test engine 122 and detection engine 126. Detected vulnerabilities may be stored in vulnerability queue 154. Detection engine 126 may comprise a vulnerability reporting detector 402 that may be configured to identify one or more vulnerabilities 404. Detection engine 126 may also comprise a callback detector 406 that may be configured to identify one or more injections 408. Test engine 122 may comprise one or more test scripts 132. In the example embodiment shown in FIG. 4, test scripts 132 comprise example scripts Script A, Script B and Script C. Controller hub 120 may facilitate communication between detection engine 126 and test engine 122.

According to embodiments of the present disclosure, Script A and Script B may register vulnerabilities 404 with vulnerability reporting detector 402. For example, Script A may register a javascript vulnerability and Script B may register a form-based vulnerability. In addition, Script A may identify and register a vulnerability in vulnerability queue 154 directly, bypassing detection engine 126. When detection engine 126 inspects responses from web site 140, vulnerability reporting detector 402 may identify vulnerabilities 404 in the responses and register the vulnerabilities in vulnerability queue 154. For example, a form-based vulnerability from Script B may be detected and registered in vulnerability queue 154.

Script C may register injections 408 with callback detector 406. When detection engine 126 inspects responses from web site 140, callback detector 406 may identify injections 408 in the responses and send back the identified injections ("callbacks") to Script C. In example embodiments, one or more of the callbacks may result in detector scripts 144 giving control back to test scripts 132 for determining whether there is a vulnerability. Script C may populate vulnerability queue 154 with the identified injections in web site 140.

Figure 6:
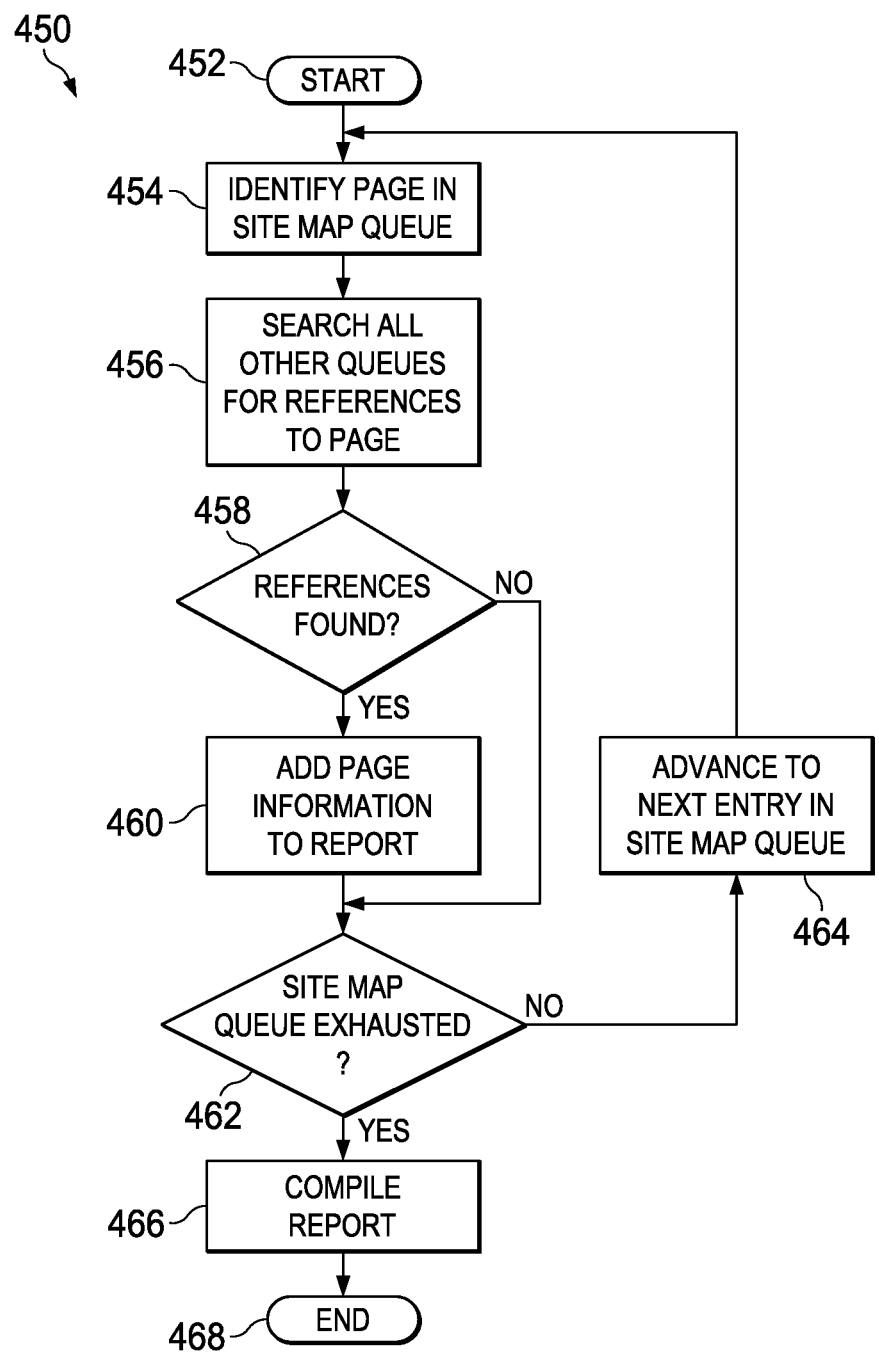
FIG. 6 is a simplified flow-chart illustrating example operational steps that may be associated with an embodiment of the present disclosure.

Turning to FIG. 6, FIG. 6 is a simplified flow-chart illustrating example operational steps associated with an embodiment of the present disclosure. Method 450 begins in step 452 when controller hub 120 activates a reporting process at the end of an assessment. In step 454, controller hub 120 steps through site map queue 148 in queue framework module 128 and identifies a first page. In step 456, controller hub 120 parses and searches all other queues in queue framework module 128 seeking entries that reference the page. For example, the first page in site map queue 148 may be a login page. Authentication queue 150 may reference the login page. Vulnerability queue 154 may also contain login vulnerabilities that reference the login page. Thus, different queues may be recombined at the end of the scan to provide comprehensive scan results.

If references to the page are found as determined in step 458, controller hub 120 may add the page information (e.g., login page parameters, associated vulnerabilities, references, etc.) to a report in step 460. Thus, according to embodiments of the present disclosure, reports may be generated based on content in queue framework module 128. In an example embodiment, report files can contain contents of all "reporting" caches (e.g., vulnerability cache 154). In yet another example embodiment, report files can contain a record of all requests, responses and vulnerabilities detected, including the beginning and end of a location of a vulnerability on a page in web site 140.

According to embodiments of the present disclosure, report files may be formatted in XML and may be configured to be fed into a display or database. Report files may be associated with standalone products, or they may be integrated into other software such as McAfee® Vulnerability Manager™ product. For example, report files can contain vulnerabilities as part of XML results sent back to McAfee® Vulnerability Manager™. In an example embodiment, report files may not be generated until the entire scan is done. Alternatively, report files may be generated while vulnerabilities and injections are identified during the testing process. In yet other embodiments, any suitable combination of immediately generating or delaying generating report files may be implemented.

If no references are found as determined in step 458, and/or information has been added to a report in step 460, controller hub 120 may check whether site map queue 128 is exhausted in step 462. If site map queue 148 is not exhausted, controller hub 120 may move to the next entry (e.g., next page) in site map queue 148 in step 464. If site map queue 148 is exhausted, controller hub 120 may compile the report in step 466. Thus, when the report is compiled in step 466, all relevant pages in site map queue 148 have been checked by controller hub 120 to generate the report.

In an example embodiment, the report may be in a hierarchical tree format in an XML document. For example, each page in the report may be referenced by vulnerabilities and links (e.g., each page may have one or more associated vulnerabilities, and one or more links to other pages). An XML tree is a representation of XML nodes (e.g., elements and text) in a hierarchical form. The root node of an XML document tree corresponds to a root element in the XML document. Child nodes descending from the root node correspond to XML elements nested inside the XML document's root element. For example, a page may correspond to a root node, and vulnerabilities and links that reference the page may correspond to child nodes in the hierarchical tree. In an example embodiment, controller hub 120 may be configured to compile the report in a particular format (e.g., sorted by pages). In another example embodiment, controller hub 120 may be configured to permit a user to compile the report. In example embodiments, the report may contain vulnerabilities, links, forms, authentication items and logout items. Additionally, while the XML tree format is one example of a reporting scheme of application security assessment embodiments disclosed herein, any other appropriate reporting scheme for reporting vulnerabilities, links, forms, authentication items, logout items, etc. may also be used. The process ends in step 468.

Although the embodiments described herein have referred to application security assessment, it will be apparent that other sets of program files may be evaluated and/or remediated using system 100. The options for application security assessment, as shown in FIGURES, are for example purposes only. It will be appreciated that numerous other options, at least some of which are detailed herein in this Specification, may be provided in any combination with or exclusive of the options of the various FIGURES.

Software for achieving the application security assessment operations outlined herein can be provided at various locations (e.g., the corporate IT headquarters, end user computers, web servers, distributed servers in the cloud, software security provider cloud or datacenter, etc.). In some embodiments, this software could be received or downloaded from a web server (e.g., in the context of purchasing individual end-user licenses for separate networks, devices, servers, etc.) in order to provide this system for application security assessment. In one example implementation, this software is resident in one or more computers and/or web hosts sought to be protected from a security attack (or protected from unwanted or unauthorized manipulations of data).

Application security assessment system 100 may be implemented in hardware or software, and may be used to assess web sites either remotely or locally. In an example embodiment, system 100 may be implemented as a remote automated service such as a scanner alert product that can scan a targeted web site according to a pre-determined schedule, for example, once every 24 hours. In another example embodiment, system 100 may be implemented as a portable solution that can be temporarily loaded onto a network connected to a target web site, for example, a local network comprising an associated web host. System 100 may perform a deep inspection of web sites and scan for vulnerabilities. In yet another example embodiment, system 100 may be hosted on a local computer, for example, a web host of a target web site. Because web sites generally communicate over hypertext transfer protocol (http), any firewalls present in associated computers and/or networks would rarely intervene to prevent operation of system 100.

In various embodiments, the software of the system for application security assessment in a computer network environment could involve a proprietary element (e.g., as part of a network security solution with vulnerability management products such as McAfee® Vulnerability Manager (MVM) products including products formerly known as Foundstone, McAfee® Security-as-a-Service (SaaS) products including products formerly known as Scan Alert, and McAfee® Secure™ Trustmark and PCI Scan products including products formerly known as Hacker Safe, etc.), which could be provided in (or be proximate to) these identified elements, or be provided in any other device, server, network appliance, console, firewall, switch, information technology (IT) device, distributed server, etc., or be provided as a complementary solution, or otherwise provisioned in the network.

In certain example implementations, the application security assessment activities outlined herein may be implemented in software. This could be inclusive of software provided in application security assessment engine 110 and in other network elements (e.g., web hosts 142) including web application files. These elements and/or modules can cooperate with each other in order to perform the web application activities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the application security assessment operations, as outlined herein. One or more of these elements may include any suitable algorithms, hardware, software, components, modules, interfaces, or objects that facilitate the operations thereof. In the implementation involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory 114) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 112 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Application security assessment engine 110 and other associated components in system 100 can include one or more memory elements (e.g., memory 114) for storing information to be used in achieving operations associated with the application security assessment as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements and modules. However, this has been done for purposes of clarity and example only. It should be appreciated that the system can be consolidated in any suitable manner. Along similar design alternatives, any of the illustrated computers, modules, components, and elements of FIG. 1 may be combined in various possible configurations, all of which are clearly within the broad scope of this Specification. In certain cases, it may be easier to describe one or more of the functionalities of a given set of flows by only referencing a limited number of network elements. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
    running at least one test script to generate a request to a target application associated with a web site;
    receiving a response from the target application;
    running at least one detector script to inspect the response for at least one vulnerability;
    identifying at least one JavaScript associated with the web site;
    adding the at least one JavaScript to a queue in a queue framework;
    running an additional script that tests for vulnerabilities specific to the at least one JavaScript;
    running a plurality of test scripts in parallel to generate respective requests to a plurality of pages at the web site, wherein the plurality of test scripts correspond, at least, to web content on a first one of the plurality of pages, and to a form on a second one of the plurality of pages;
    collecting corresponding responses from the plurality of pages; and
    running a plurality of detector scripts to inspect the corresponding responses from the plurality of pages.

2. The method of claim 1, wherein the target application is associated with a web page.

3. The method of claim 2, wherein the at least one test script is selected from a group comprising banner test, crawl test, page test, and residual test.

4. The method of claim 2, further comprising populating a plurality of work in a plurality of queues, wherein the plurality of work comprises one or more of site map, logout, evidence, authentication, pages, links, work entry, scripts, vulnerabilities, and errors.

5. The method of claim 4, further comprising:
identifying a page in a site map queue;
searching the plurality of queues for at least one reference to the page; and
adding page information to a report if the at least one reference is found.

6. The method of claim 1, further comprising populating a work in at least one queue.

7. The method of claim 6, wherein the work corresponds to a content in the response.

8. The method of claim 6, further comprising:
extracting the work from the at least one queue; and
running a second test script corresponding to the extracted work.

9. The method of claim 1, further comprising running a second test script to generate a follow-up request to the target application if the at least one vulnerability has been identified in the response.

10. The method of claim 1, further comprising running a second detector script to generate a follow-up request to the target application if the at least one vulnerability has been identified in the response.

11. The method of claim 1, further comprising:
storing at least one injection in an injection cache;
de-registering the at least one injection from the injection cache if the at least one injection is identified in the response; and
re-crawling the target application, if the at least one injection has not been de-registered from the injection cache.

12. The method of claim 1, further comprising adding at least one test script, at least one detector script and at least one queue.

13. An apparatus comprising:
a memory element configured to store data;
a network interface; and
a computing processor operable to execute instructions associated with the data, wherein the network interface, computing processor and the memory element cooperate such that the apparatus is configured for:
running at least one test script to generate a request to a target application associated with a web site;
receiving a response from the target application;
running at least one detector script to inspect the response for at least one vulnerability;
identifying at least one JavaScript associated with the web site;
adding the at least one JavaScript to a queue in a queue framework;
running an additional script that tests for vulnerabilities specific to the at least one JavaScript;
running a plurality of test scripts in parallel to generate respective requests to a plurality of pages at the web site, wherein the plurality of test scripts correspond, at least, to web content on a first one of the plurality of pages, and to a form on a second one of the plurality of pages;
collecting corresponding responses from the plurality of pages; and
running a plurality of detector scripts to inspect the corresponding responses from the plurality of pages.

14. The apparatus of claim 13, wherein the processor is operable to perform further instructions comprising populating a work in at least one queue.

15. The apparatus of claim 13, wherein the processor is operable to perform further instructions comprising:
storing at least one injection in an injection cache;
de-registering the at least one injection from the injection cache if the at least one injection is identified in the response; and
re-crawling the target application, if the at least one injection has not been de-registered from the injection cache.

16. The apparatus of claim 13 wherein the processor is operable to execute further instructions associated with a feed module, the further instructions comprising adding at least one test script, at least one detector script and at least one queue.

17. A non-transitory computer readable storage media that includes code for execution and when executed by a processor is operable to perform operations comprising:
running at least one test script to generate a request to a target application associated with a web site;
receiving a response from the target application;
running at least one detector script to inspect the response for at least one vulnerability;
identifying at least one JavaScript associated with the web site;
adding the at least one JavaScript to a queue in a queue framework;
running an additional script that tests for vulnerabilities specific to the at least one JavaScript;
running a plurality of test scripts in parallel to generate respective requests to a plurality of pages at the web site, wherein the plurality of test scripts correspond, at least, to web content on a first one of the plurality of pages, and to a form on a second one of the plurality of pages;
collecting corresponding responses from the plurality of pages; and
running a plurality of detector scripts to inspect the corresponding responses from the plurality of pages.

18. The media of claim 16, the processor being operable to perform further operations comprising populating a work in at least one queue.

19. The media of claim 16, the processor being operable to perform further operations comprising:
storing at least one injection in an injection cache;
de-registering the at least one injection from the injection cache if the at least one injection is identified in the response; and
re-crawling the target application, if the at least one injection has not been de-registered from the injection cache.

20. The media of claim 16, the processor being operable to perform further operations comprising adding at least one test script, at least one detector script and at least one queue.

* * * * *